United States Patent
Saito et al.

(10) Patent No.: US 9,819,010 B2
(45) Date of Patent: Nov. 14, 2017

(54) SECONDARY CELL, METHOD FOR MANUFACTURING SECONDARY CELL, POSITIVE ELECTRODE FOR SECONDARY CELLS, METHOD FOR MANUFACTURING POSITIVE ELECTRODE FOR SECONDARY CELLS, BATTERY PACK, ELECTRONIC DEVICE, AND ELECTRIC VEHICLE

(71) Applicant: Sony Corporation, Tokyo (JP)

(72) Inventors: Yosuke Saito, Kanagawa (JP);
Kazumasa Takeshi, Tokyo (JP);
Masataka Nakajin, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 423 days.

(21) Appl. No.: 14/201,342

(22) Filed: Mar. 7, 2014

(65) Prior Publication Data

US 2014/0272545 A1    Sep. 18, 2014

(30) Foreign Application Priority Data

Mar. 12, 2013 (JP) .................................. 2013-049208

(51) Int. Cl.
| | | |
|---|---|---|
| H01M 4/136 | (2010.01) | |
| H01M 4/1397 | (2010.01) | |
| H01M 4/04 | (2006.01) | |
| H01M 10/052 | (2010.01) | |
| H01M 10/0587 | (2010.01) | |

(52) U.S. Cl.
CPC ......... *H01M 4/136* (2013.01); *H01M 4/0402* (2013.01); *H01M 4/1397* (2013.01); *H01M 10/052* (2013.01); *H01M 10/0587* (2013.01); *Y02E 60/122* (2013.01); *Y02P 70/54* (2015.11); *Y02T 10/7011* (2013.01)

(58) Field of Classification Search
CPC ...................................................... H01M 4/136
See application file for complete search history.

(56) References Cited

U.S. PATENT DOCUMENTS

| | | | | |
|---|---|---|---|---|
| 3,915,743 A | * | 10/1975 | Lauck | ............... H01M 10/0566 |
| | | | | 429/218.1 |
| 2004/0191629 A1 | * | 9/2004 | Itaya | ................... H01M 4/0402 |
| | | | | 429/231.95 |
| 2011/0195315 A1 | * | 8/2011 | Tsuchida | ................ H01M 4/13 |
| | | | | 429/319 |
| 2012/0150375 A1 | * | 6/2012 | Adachi | ................... H01M 2/34 |
| | | | | 701/22 |

FOREIGN PATENT DOCUMENTS

| | | |
|---|---|---|
| JP | 62-246810 | 10/1987 |
| JP | 06-191805 | 12/1994 |
| JP | 2002-329495 | 11/2002 |
| JP | 2003-197196 | 7/2003 |
| JP | 2004-342575 | 12/2004 |
| JP | 2005-251473 | 9/2005 |
| JP | 2009-076260 | 4/2009 |

OTHER PUBLICATIONS

JP2002-329495 MT.*
Meyer at all, Chem. Rev, 1976, 76,3, 367-388.*

* cited by examiner

*Primary Examiner* — Alex Usyatinsky
(74) *Attorney, Agent, or Firm* — Dentons US LLP

(57) ABSTRACT

A secondary cell has a positive electrode, a negative electrode, and an electrolyte, and the positive electrode contains insoluble sulfur.

4 Claims, 12 Drawing Sheets

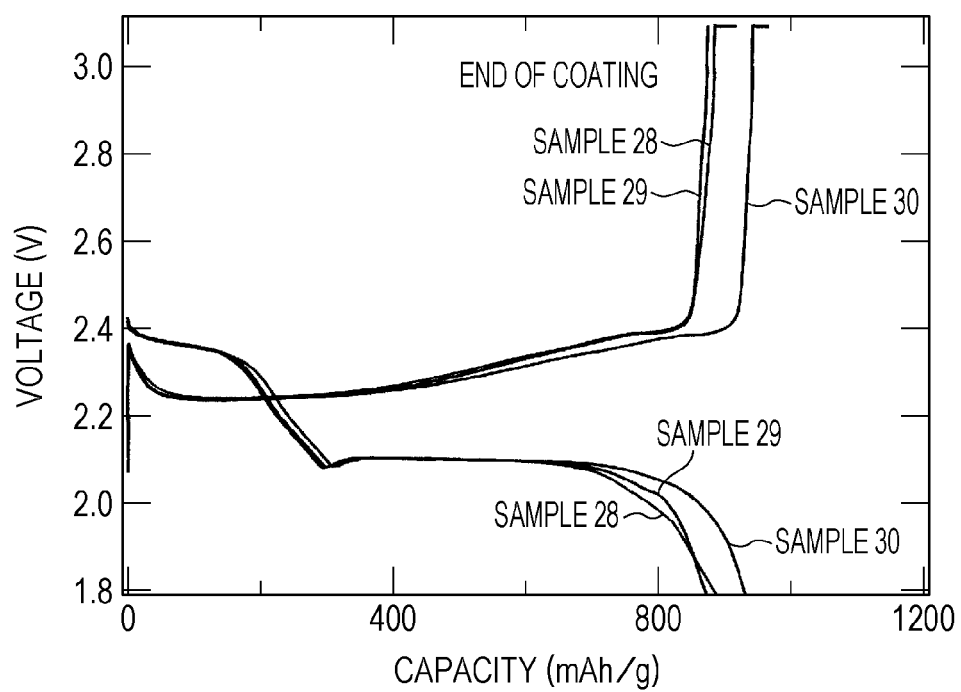

S₈, START OF COATING

S₈, END OF COATING

INSOLUBLE S, START OF COATING

INSOLUBLE S, END OF COATING

SECONDARY CELL, METHOD FOR MANUFACTURING SECONDARY CELL, POSITIVE ELECTRODE FOR SECONDARY CELLS, METHOD FOR MANUFACTURING POSITIVE ELECTRODE FOR SECONDARY CELLS, BATTERY PACK, ELECTRONIC DEVICE, AND ELECTRIC VEHICLE

CROSS REFERENCE TO RELATED APPLICATIONS

This application claims the benefit of Japanese Priority Patent Application JP 2013-049208 filed Mar. 12, 2013, the entire contents of which are incorporated herein by reference.

BACKGROUND

The present disclosure relates to a secondary cell, a method for manufacturing a secondary cell, a positive electrode for secondary cells, a method for manufacturing a positive electrode for secondary cells, a battery pack, an electronic device, and an electric vehicle. More specifically, the present disclosure relates to a secondary cell that has a sulfur-containing positive electrode and such a positive electrode, methods for manufacturing such a secondary cell and such a positive electrode, and the application of such a secondary cell.

Lithium-sulfur cells, which are secondary cells in which the active material for the positive electrode is sulfur, are of public interest because this type of secondary cell can have much better recharge performance than lithium-ion cells (e.g., see Japanese Unexamined Patent Application Publication Nos. 2005-251473, 2009-76260, and 2003-197196). A lithium-sulfur cell usually has a positive electrode made of crystalline sulfur (or cyclosulfur) ($S_8$), a negative electrode made of metallic lithium, and a non-aqueous electrolyte that contains lithium ions ($Li^+$). Sulfur alone is of very low conductivity and is usually mixed with a conducting agent so that an effective active material can be obtained. Sulfur can be in a particulate form when mixed with a conducting agent so that continuity can be more easily provided and better characteristics can be obtained.

SUMMARY

As mentioned above, the starting material sulfur for such a typical lithium-sulfur cell is usually crystalline sulfur. Crystalline sulfur is obtained through purification processes including sublimation and recrystallization from carbon disulfide, and the resulting particles have a large particle diameter. Commercially available crystalline sulfurs, which are manufactured by pulverizing such coarse particles, are as large as about 40 to 100 μm in particle diameter because of the large diameter of the initial particles; such commercial products are additionally ground before use. Furthermore, the positive electrode that contains crystalline sulfur is formed from a slurry that contains carbon as a conducting agent in addition to the crystalline sulfur. Such a slurry is difficult to apply because the dispersion of crystalline sulfur in the slurry is often poor. Coatings formed from such a slurry are uneven, and this affects the yield of the coatings. Such coatings, furthermore, contain many aggregate clusters, which make the density of the coatings low (e.g., about 0.3 to 0.4 g/cc) and affect the capacity per unit electrode volume of the cell.

It is therefore desirable to provide a secondary cell and a method for manufacturing a secondary cell that both have the following advantages: a simplified and high-yield process for preparing a sulfur-containing positive electrode, an improved capacity per unit electrode volume, and extremely stable charge-discharge characteristics.

It is also desirable to provide a positive electrode for secondary cells and a method for manufacturing a positive electrode for secondary cells that both have the following advantages: a simplified and high-yield process for producing the positive electrode that can be used when the positive electrode contains sulfur, an improved capacity per unit electrode volume, and extremely stable charge-discharge characteristics.

Furthermore, it is desirable to provide a battery pack, an electronic device, and an electric vehicle that all use the aforementioned excellent secondary cell.

An embodiment of the present disclosure is a secondary electrode. The secondary cell has a positive electrode, a negative electrode, and an electrolyte, and the positive electrode contains insoluble sulfur.

Another embodiment of the present disclosure is a method for manufacturing a secondary cell. The method includes applying a slurry that contains insoluble sulfur to a conductive substrate to form a positive electrode.

Another embodiment of the present disclosure is a positive electrode for secondary cells. The positive electrode has a conductive substrate and insoluble sulfur on the conductive substrate.

Another embodiment of the present disclosure is a method for manufacturing a positive electrode for secondary cells. The method includes applying a slurry that contains insoluble sulfur to a conductive substrate to form the positive electrode.

Another embodiment of the present disclosure is a battery pack. The battery pack has a secondary cell, a control unit for the secondary cell, and a package that contains the secondary cell. The secondary cell has a positive electrode, a negative electrode, and an electrolyte, and the positive electrode contains insoluble sulfur.

The control unit of this battery pack controls, for example, the charge, discharge, overcharge, and overdischarge of the secondary cell.

Another embodiment of the present disclosure is an electronic device. The electronic device has a secondary cell and is powered by the secondary cell. The secondary cell has a positive electrode, a negative electrode, and an electrolyte, and the positive electrode contains insoluble sulfur.

Another embodiment of the present disclosure is an electric vehicle. The electric vehicle has a secondary cell and a transducer. The secondary cell has a positive electrode, a negative electrode, and an electrolyte, and the positive electrode contains insoluble sulfur. The transducer receives electric power from the secondary cell and converts the received electrical power into a force that drives the vehicle.

Typically, the transducer for this electric vehicle produces the driving force by rotating a motor with the electric power received from the secondary cell. Regenerated energy can also be used to drive the motor. The control unit carries out tasks such as processing information concerning the control of the vehicle depending on the remaining life of the secondary cell. Examples of suitable electric vehicles include electric automobiles, electric bikes, electric bicycles, and railway cars and also include hybrid automobiles.

Another embodiment of the present disclosure is an electric power system. The electric power system has a secondary cell. The secondary cell has a positive electrode, a negative electrode, and an electrolyte, and the positive electrode contains insoluble sulfur. The electric power system is powered by the secondary cell and/or supplies electric power from a power source to the secondary cell.

This electric power system can be any system that handles electric power and can even be a simple electric power unit. Examples of suitable electric power systems include smart grids, home energy management systems (HEMS), and vehicles. The electric power system can also store electrical energy.

Another embodiment of the present disclosure is a power supply for power storage. The power supply has a secondary cell and can be connected with the electronic device to be powered. The secondary cell has a positive electrode, a negative electrode, and an electrolyte, and the positive electrode contains insoluble sulfur.

Basically, this power supply for power storage can be used with any electric power system or electric power unit. For example, the power supply can be used with a smart grid.

The following describes insoluble sulfur (also referred to as polymeric sulfur). Sulfur undergoes gradual structural changes with increasing temperature. Not only the simple transitions between the three phases, i.e., solid, liquid, and gas, but also changes in crystallographic structure occur, forming a long-chain structure. This long-chain form of sulfur is referred to as insoluble sulfur. The term insoluble in "insoluble sulfur" means that the sulfur is insoluble in carbon disulfide ($CS_2$). Insoluble sulfur can be used as a vulcanizing agent, i.e., an agent used to add sulfur to rubber in a vulcanization process. Crystalline sulfur ($S_8$) has a ring structure and is soluble in carbon disulfide. In the present disclosure, the positive electrode generally contains insoluble sulfur and a conducting agent, and typically further contains a binder. More specifically, the positive electrode has, for example, a conductive substrate and a mixture of insoluble sulfur and a conducting agent or a mixture of insoluble sulfur, a conducting agent, and a binder. The conducting agent contains, for example, at least one carbon material. The at least one carbon material includes, for example, at least one selected from carbon black, activated carbon, carbon fiber, carbon nanotubes, and graphene. Examples of carbon blacks that can be used include Carbon Black #3030B, #3040B, #3050B, #3230B, and #3350B (Mitsubishi Chemical), TOKABLACK #5500, TOKABLACK #4500, TOKABLACK #4400, and TOKABLACK #4300 (Tokai Carbon), Printex L6 and Printex L (Degussa), Conductex 975 and Conductex SC (Columbian Chemicals), Vulcan XC 72, Vulcan 9A 32, Black Pearls 2000, and Black Pearls 3700 (Cabot), DENKA BLACK Powder, DENKA BLACK FX-35, and DENKA BLACK HS-100 (Denki Kagaku Kogyo), Ensaco 250G, Ensaco 260G, Ensaco 350G, and Super P-Li (TIMCAL), and KETJENBLACK EC-300J, EC-600JD, ECP, and ECP-600JD (Lion Corporation), and KETJENBLACK carbon blacks are preferred. Examples of activated carbons that can be used include those made from coal-based materials (e.g., peat, lignite, brown coal, and bituminous coal), plant biomass materials (e.g., coconut shells, sawdust, rice husks, and lumber), and other materials (e.g., petroleum pitch, plastics (polymers), and organic ashes). Activated carbon is generally produced by carbonizing a starting material and then activating the carbonized material. Carbonization usually includes heating the carbon, hydrogen, and oxygen in the starting material in an inert gas atmosphere at 400° C. to 700° C. to remove some volatile compounds and subsequently preparing a suitable carbide from the heated material for activation. Activation is a process in which the prepared carbide is brought into reaction at high temperatures of 600° C. to 1000° C. by using steam, carbon dioxide gas, and air so that the remaining volatile compounds and the carbon atoms in the carbide can gasify and that a porous structure mainly with 10- to 100-Å pores can grow until the internal surface area reaches at least 1000 $m^2/g$. This process provides a porous activated carbon. Vapor-grown carbon fibers, a category of carbon fibers, are produced by carbonizing the starting material acrylic fiber or pitch (a by-product of the production of petroleum, coal, coal tar, etc.) at a high temperature, and an example is VGCF (a registered trademark of Showa Denko K.K.). Examples of binders that can be used include polyvinyl alcohol (PVA), polyvinylidene fluoride (PVDF), styrene butadiene rubber (SBR), carboxymethylcellulose (CMC), polyamides (PAs), polyamideimides (PAIS), sodium polyacrylate (PANa), polyvinylpyrrolidone (PVP), polyethylene oxide (PEO), polytetrafluoroethylene (PTFE), polyethylene (PE), polypropylene (PP), and agar. The negative electrode contains, for example, a material that occludes and releases lithium ions. More generally, the negative electrode contains, for example, at least one selected from lithium, sodium, magnesium, a magnesium salt, aluminum, a lithium-containing alloy, a carbon material capable of occluding and releasing lithium ions, tin oxide, silicon, and titanium oxide. The electrolyte contains, for example, at least one cation selected from lithium, sodium, magnesium, aluminum, and tetraalkylammonium ions.

In some of the foregoing embodiments of the present disclosure, the slurry allows the insoluble sulfur contained therein to be sufficiently mixed at ease because the insoluble sulfur is highly dispersible in the slurry. Coatings formed from the slurry are therefore highly uniform and very smooth. In the above embodiments, furthermore, industrially produced and commercially available fine powders of insoluble sulfur can be used without additional grinding.

The present disclosure provides a secondary cell that has the following advantages: a simplified and high-yield process for preparing a sulfur-containing positive electrode, an improved capacity per unit electrode volume, and extremely stable charge-discharge characteristics. The present disclosure also provides, for example, an electronic device, a battery pack, an electric vehicle, an electric power system, and a power source for power storage that all are of high performance thanks to the use of this excellent secondary cell.

BRIEF DESCRIPTION OF THE DRAWINGS

FIG. 6 is a diagram that shows the charge-discharge characteristics of some other lithium-sulfur cells in which the insoluble-sulfur-containing positive electrode of the Example was used.

DETAILED DESCRIPTION OF EMBODIMENTS

The following describes some embodiments of the present disclosure (hereinafter simply referred to as embodiments). The descriptions are provided in the following order:

1. Embodiment 1 (a positive electrode for lithium-sulfur cells and a method for manufacturing the positive electrode);
2. Embodiment 2 (a lithium-sulfur cell);
3. Embodiment 3 (a lithium-sulfur cell and a method for manufacturing the lithium-sulfur cell).

1. Embodiment 1

Positive Electrode for Lithium-Sulfur Cells

Figure 1A:
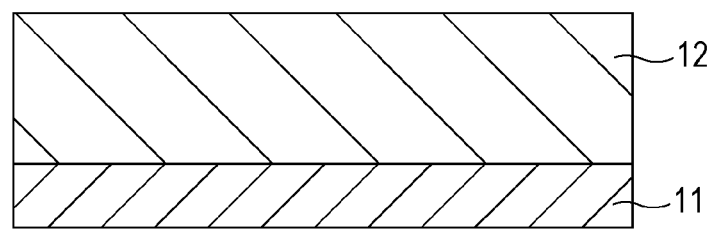
FIGS. 1A and 1B are a cross-sectional view and a plan view, respectively, of a positive electrode for lithium-sulfur cells according to Embodiment 1.
Figure 1B:
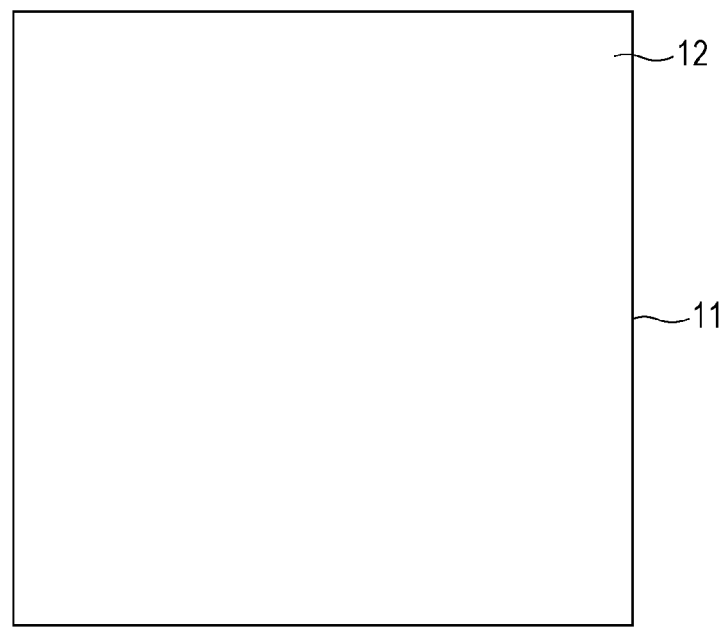

FIG. 1A is a cross-sectional view of a positive electrode for lithium-sulfur cells according to Embodiment 1. FIG. 1B is a plan view of the same positive electrode for lithium-sulfur cells.

As illustrated in FIGS. 1A and 1B, this positive electrode for lithium-sulfur cells has a conductive substrate 11 and a layer that contains insoluble sulfur (an insoluble sulfur layer 12). The insoluble sulfur layer 12 typically contains either of the following: insoluble sulfur and a conducting agent; or insoluble sulfur, a conducting agent, and a binder. The insoluble sulfur content is preferably 50% by weight or more, e.g., 60% by weight or more; however, these compositions and insoluble sulfur content parameters are not the only possible options. The conducting agent is an appropriate substance selected from, for example, the aforementioned materials and is preferably KETJENBLACK. The insoluble sulfur layer 12 may contain other appropriate components in addition to the insoluble sulfur, the conducting agent, and the binder.

The conductive substrate 11 is a substrate made of a conductive material. Examples of materials that can be used include, but are not limited to, metals (pure metals and alloys), conductive oxides, and conductive plastics. Specific examples of metals that can be used include aluminum (Al), platinum (Pt), silver (Ag), gold (Au), ruthenium (Ru), rhodium (Rh), osmium (Os), niobium (Nb), molybdenum (Mo), indium (In), iridium (Ir), zinc (Zn), manganese (Mn), iron (Fe), nickel (Ni), cobalt (Co), titanium (Ti), vanadium (V), chromium (Cr), palladium (Pd), rhenium (Re), tantalum (Ta), tungsten (W), zirconium (Zr), germanium (Ge), and hafnium (Hf) used in the form of a pure metal, a combination of metals, and an alloy (e.g., stainless steel). The conductive substrate 11 may be composed of a non-conductive substrate and a conductive layer. The thickness of the conductive substrate 11 is selected as appropriate and can be in the range of 20 μm to 50 μm, both inclusive, for example.

Method for Manufacturing the Positive Electrode for Lithium-Sulfur Cells

The following describes an illustrative method for manufacturing this positive electrode for lithium-sulfur cells.

Figure 2A:
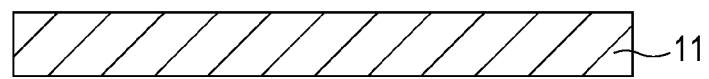
FIGS. 2A to 2C are cross-sectional diagrams that illustrate a method for manufacturing a positive electrode for lithium-sulfur cells according to Embodiment 1.

First, a conductive substrate 11 is provided as illustrated in FIG. 2A.

Figure 2B:
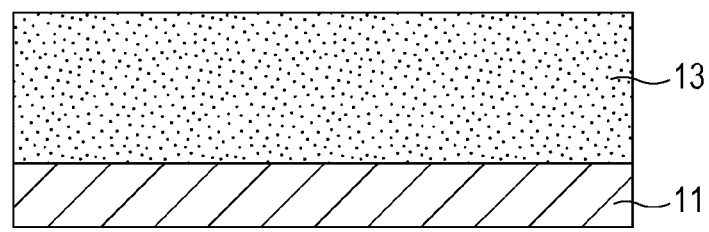

Then a separately prepared slurry 13 that contains insoluble sulfur is applied to the conductive substrate 11 as illustrated in FIG. 2B. A typical composition of the slurry 13 is, for example, insoluble sulfur, a conducting agent (e.g., a carbon powder), a binder (e.g., PVA), and a solvent. Various coating processes can be used to apply the slurry 13; specific examples include knife-over-roll coating, dip coating, spray coating, wire bar coating, spin coating, roller coating, blade coating, and gravure coating.

Figure 2C:
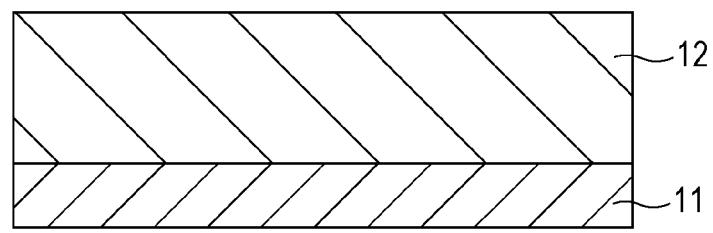

Then the conductive substrate 11 is heated with the slurry 13 thereon until the slurry 13 dries up and leaves an insoluble sulfur layer 12 as illustrated in FIG. 2C. This heat treatment is carried out using, for example, a heating furnace. The heating temperature is selected as appropriate and can be in the range of 50° C. to 100° C., both inclusive, for example. Preferably, an argon (Ar), nitrogen ($N_2$), or other inert gas atmosphere is used so that the insoluble sulfur and the conducting agent can be prevented from being thermally oxidized.

In such a way, the intended positive electrode for lithium-sulfur cells is manufactured.

Embodiment 1 therefore provides a novel positive electrode for lithium-sulfur cells that has a conductive substrate 11 and a layer that contains insoluble sulfur (an insoluble sulfur layer 12). This positive electrode for lithium-sulfur cells can be manufactured by applying a slurry 13 that contains insoluble sulfur to the conductive substrate 11. Compared to coatings formed from a slurry that contains crystalline sulfur, the resulting coating is highly uniform and very smooth and is also dense; the density of the coating is 0.5 g/cc or more, for example. As a result, the energy density of lithium-sulfur cells is advantageously improved.

Insoluble sulfur is produced by adding gaseous sulfur to carbon disulfide and allowing sulfur to precipitate. The obtained particles of insoluble sulfur have small diameters and are easy to pulverize. Thus, industrially produced fine powders of insoluble sulfur that have particle diameters on the order of 4 to 10 μm are commercially available, and such commercial products can be used without additional grinding, unlike crystalline sulfur; the use of insoluble sulfur simplifies processes for manufacturing positive electrodes for lithium-sulfur cells, improving the yield and reducing the manufacturing cost. The use of this positive electrode for lithium-sulfur cells as a component of lithium-sulfur cells therefore reduces the cost of producing the lithium-sulfur cells.

Another advantage of this positive electrode for lithium-sulfur cells is that the slurry 13 that contains insoluble sulfur forms very little aggregate while being applied. The resulting coating is therefore highly uniform and very smooth. As a result, lithium-sulfur cells that contain this positive electrode for lithium-sulfur cells have extremely stable charge-discharge characteristics.

2. Embodiment 2

Lithium-Sulfur Cell

The following describes Embodiment 2. In Embodiment 2, a positive electrode for lithium-sulfur cells according to Embodiment 1 is used as the positive electrode of a lithium-sulfur cell, a form of a secondary cell.

Figure 3:
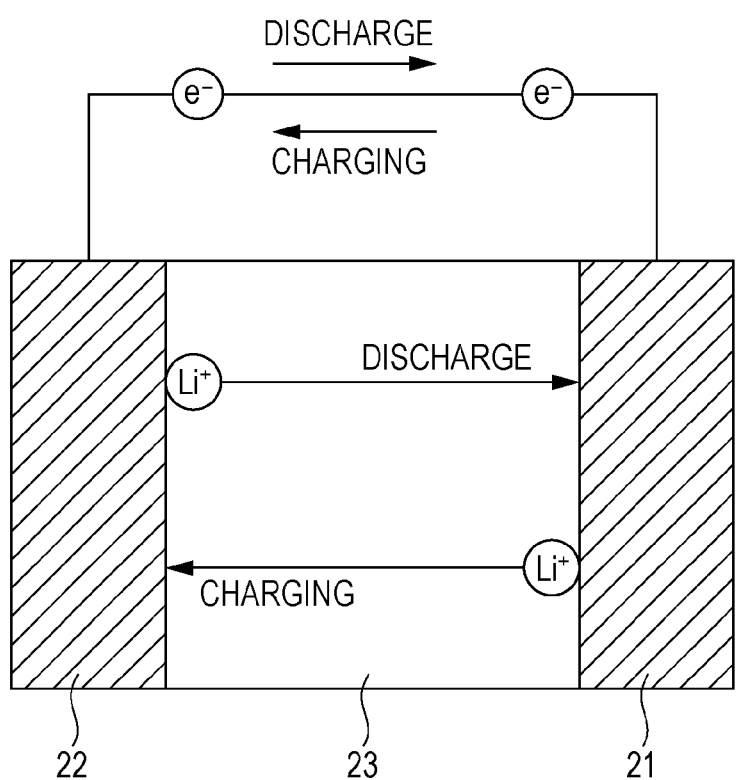
FIG. 3 is a schematic diagram that illustrates a lithium-sulfur cell according to Embodiment 2.

FIG. 3 schematically illustrates the basic structure of this lithium-sulfur cell.

As illustrated in FIG. 3, this lithium-sulfur cell has a positive electrode 21 and a negative electrode 22 that face each other with an electrolyte 23 therebetween. A separator is also disposed between the positive electrode 21 and the negative electrode 22 (not illustrated in FIG. 3). The positive electrode 21 is a positive electrode for lithium-sulfur cells according to Embodiment 1, whereas the negative electrode 22 is made of metallic lithium. Materials other than metallic lithium can also be used to make the negative electrode 22, including carbon materials capable of occlude and release lithium ions as well as tin oxide, silicon, and titanium oxide.

The electrolyte 23 can be a liquid, a gel, or a solid. When the electrolyte 23 is a gel or a solid, examples of suitable materials include polymers such as polyvinylidene fluoride (PVDF), hexafluoropropylene (HFP), polyvinylidene fluoride-hexafluoropropylene (PVDF-HFP), polyaniline (PAN), and polyethylene oxide (PEO). Copolymers composed of such polymers can also be used.

When the electrolyte 23 is an electrolytic solution, the electrolytic solution can be, for example, a solution of a lithium salt in one or a mixture of two or more organic solvents for lithium-ion cells, capacitors, or similar devices. Examples of organic solvents that can be used include the following: carbonates such as ethylene carbonate (EC), propylene carbonate (PC), diethyl carbonate (DEC), dimethyl carbonate (DMC), methyl ethyl carbonate (MEC), and vinylene carbonate (VC); cyclic esters such as γ-butyrolactone (GBL), γ-valerolactone, 3-methyl-γ-butyrolactone, and 2-methyl-γ-butyrolactone; cyclic ethers such as 1,4-dioxane, 1,3-dioxolane, tetrahydrofuran, 2-methyltetrahydrofuran (MTHF), 3-methyl-1,3-dioxolane, and 2-methyl-1,3-dioxolane; and open-chain ethers such as 1,2-dimethoxyethane (DME), 1,2-diethoxyethane (DEE), diethyl ether, dimethyl ether, methyl ethyl ether, and dipropyl ether. Other organic solvents can also be used, including methyl propionate (MPR), ethyl propionate (EPR), ethylene sulfite (ES), cyclohexyl benzene (CHB), tetraphenyl benzene (tPB), ethyl acetate (EA), and acetonitrile (AN).

Examples of lithium salts that can be used in the electrolytic solution include $LiSCN$, $LiBr$, $LiI$, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, and $LiN(SO_2CF_3)_2$. It is also possible to use a mixture of two or more such lithium salts.

The electrolyte 23 may contain other materials as appropriate for improved characteristics of the lithium-sulfur cell. Examples of materials that can be used for such purposes include imide salts, sulfonated compounds, and aromatic compounds substituted or unsubstituted with a halogen.

Operation of the Lithium-Sulfur Cell

While the lithium-sulfur cell is charging, lithium ions ($Li^+$) move from the positive electrode 21 to the negative electrode 22 through the electrolyte 23 and the cell stores electricity by converting electrical energy into chemical energy. While the lithium-sulfur cell is discharging, lithium ions return from the negative electrode 22 to the positive electrode 21 through the electrolyte 23 and the cell produces electrical energy.

Embodiment 2 provides a novel lithium-sulfur cell that has extremely stable charge-discharge characteristics and can be manufactured at low cost thanks to the use of a positive electrode for lithium-sulfur cells according to Embodiment 1 as the positive electrode 21.

This lithium-sulfur cell can be installed in driving or auxiliary power supplies for various equipment and vehicles including the following and can also be used to power such equipment and vehicles: notebook PCs, PDAs (personal digital assistants), cellular phones, cordless handsets, camcorder/players, digital still cameras, electronic books, electronic dictionaries, mobile music players, radios, headphones, gaming consoles, navigation systems, memory cards, pacemakers, hearing aids, machine tools, electric shavers, refrigerators, air conditioners, TV sets, stereo systems, water heaters, microwave ovens, dishwashers, washing machines, drying machines, lighting, toys, medical devices, robots, load conditioners, traffic lights, railway cars, golf carts, mobility scooters, and electric automobiles (including hybrid automobiles). Likewise, this lithium-sulfur can be installed in power supplies for power storage for housing and other buildings and for power plants. Electric vehicles have a transducer that receives electric power and converts the electric power into driving force, and this transducer is generally a motor. Electric vehicles also have control units that process information concerning the control of the vehicle, including one that displays the remaining battery life based on the information about the remaining life of the cell. This lithium-sulfur cell can also be used as an accumulator in electrical grids that are called smart grids. Such an accumulator not only supplies electric power but also stores electric power when powered by another power source. Examples of power sources that can be used for such purposes include thermal, nuclear, and hydraulic power generation systems, solar cells, wind and geothermal power generation systems, and fuel cells (including biofuel cells).

Example

A positive electrode for lithium-sulfur cells was produced by the following method.

A 20-µm-thick aluminum substrate was used as the conductive substrate 11.

A slurry that contained insoluble sulfur was prepared by the following process.

(1) Insoluble sulfur (S) and KETJENBLACK (KB ECP) were mixed in a mortar for about 30 minutes.

(2) Polyvinyl alcohol (PVA) was dissolved in N-methylpyrrolidone (NMP) on a hot-plate stirrer.

(3) The products of (1) and (2) were weighed in a cup and mixed using a commercially available planetary mixer. The mixing ratios (weight ratios) S:KB:PVA were 60:30:10.

(4) NMP was added to make the solid content 20% by weight, and the obtained mixture was mixed using a commercially available planetary mixer.

(5) The mixture was put into a ball-mill pot and blended with beads in a ball mill.

(6) The beads were removed to complete the slurry.

The obtained insoluble-sulfur-containing slurry was applied to the surface of the aluminum substrate by knife-over-roll coating.

Then the coating of the slurry on the surface of the aluminum substrate was dried to form an insoluble sulfur layer that contained insoluble sulfur, KETJENBLACK, and PVA. In this way, a positive electrode for lithium-sulfur cells was produced.

Comparative Example

A positive electrode for lithium-sulfur cells was produced by the following method.

A 20-μm-thick aluminum substrate was used as the conductive substrate 11.

A slurry that contained crystalline sulfur ($S_8$) was prepared by a process similar to that in the Example.

The obtained crystalline-sulfur-containing slurry was applied to the surface of the aluminum substrate by knife-over-roll coating.

Then the coating of the slurry on the surface of the aluminum substrate was dried to form a crystalline sulfur layer that contained crystalline sulfur, KETJENBLACK, and PVA. In this way, a positive electrode for lithium-sulfur cells was produced.

Table 1 summarizes the weight, thickness, density, and other measurements of the electrode samples of the Example and the Comparative Example. Samples 1 to 6 were obtained by the method of the Comparative Example: samples 1 to 3 were produced in a single batch (Lot 1), and samples 4 to 6 were also produced in a single batch (Lot 2). Samples 11 to 16 were obtained by the method of the Example: samples 11 to 13 were produced in a single batch (Lot 3), and samples 14 to 16 were also produced in a single batch (Lot 4).

cells of the Comparative Example, two of the samples taken at the start of coating (n=2, samples 1 and 2) and two of the samples taken at the end of coating (n=2, samples 4 and 5) were individually used in lithium-sulfur cells of samples 21 to 24. For the positive electrode for lithium-sulfur cells of the Example, the three samples taken at the start of coating (n=3, samples 11 to 13) and the three taken at the end of coating (n=3, samples 14 to 16) were individually used in lithium-sulfur cells of samples 25 to 30.

Figure 4:
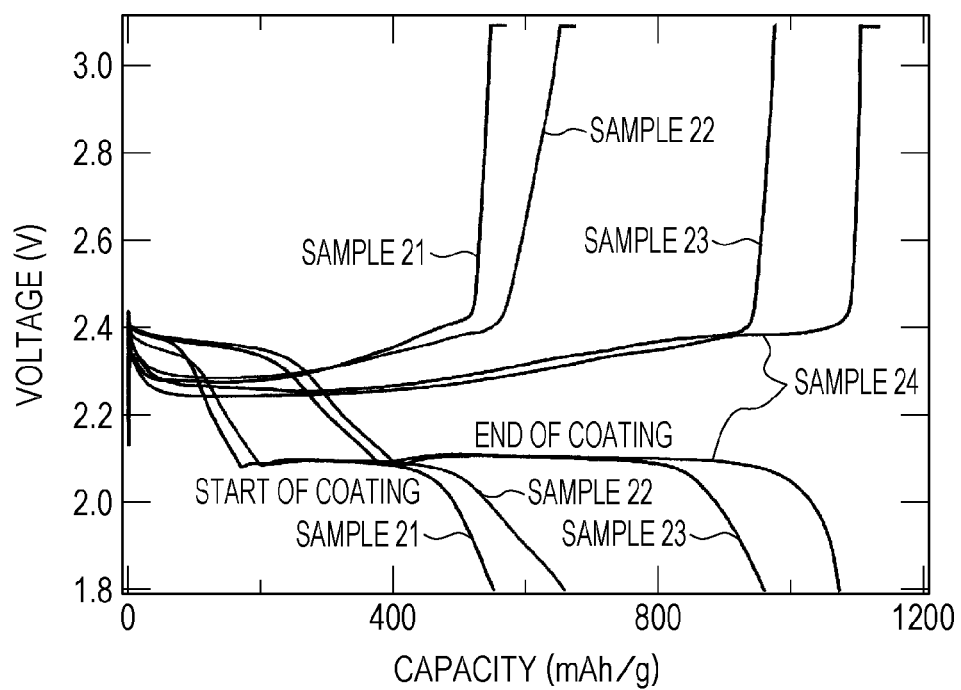
FIG. 4 is a diagram that shows the charge-discharge characteristics of some lithium-sulfur cells in which the crystalline-sulfur-containing positive electrode of the Comparative Example was used.
Figure 5:
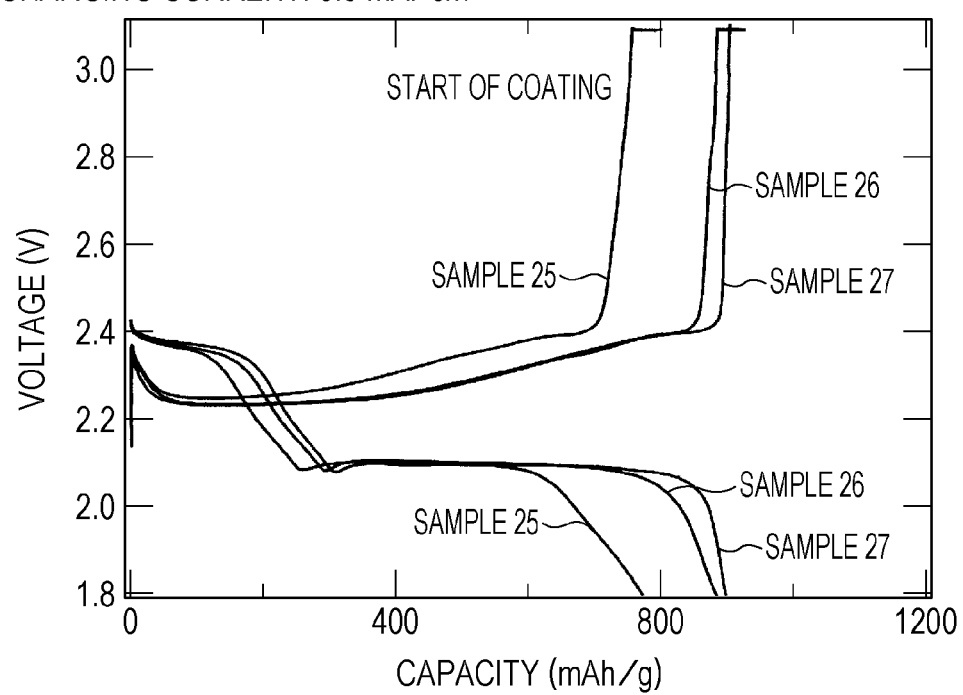
FIG. 5 is a diagram that shows the charge-discharge characteristics of some lithium-sulfur cells in which the insoluble-sulfur-containing positive electrode of the Example was used.

The charge-discharge characteristics of the lithium-sulfur cells of samples 21 to 30 were then measured. The results are shown in FIGS. 4 to 6. FIGS. 4 to 6 present the measurements obtained during the second charge-discharge cycle. The discharge current and the charging current were 0.1 $mA/cm^2$ and 0.3 $mA/cm^2$, respectively, for all samples.

When crystalline sulfur ($S_8$) was used, the charge-discharge capacity was greatly different depending on which type of positive electrode was used, start-of-coating or end-of-coating, as shown in FIG. 4, presumably because of the greater amount of aggregate in the end-of-coating positive electrode.

When insoluble sulfur (S) was used, however, the charge-discharge capacity was similar regardless of whether the type of positive electrode was start-of-coating or end-of-coating, as shown in FIGS. 5 and 6, because insoluble sulfur (S) is highly dispersible in slurry.

TABLE 1

| | Active material | Conducting agent | Binder | Sampling point | Mixture weight [mg] | Average thickness [μm] | Area density [mg/cm$^2$] | Volume density [g/cc] | Active material content [mg] |
|---|---|---|---|---|---|---|---|---|---|
| Sample 1 | Crystalline sulfur ($S_8$) | KB ECP | PVA | Start of coating | 1.96 | 30.4 | 1.11 | 0.365 | 1.18 |
| Sample 2 | | | | | 1.89 | | 1.07 | 0.352 | 1.13 |
| Sample 3 | | | | | 1.96 | | 1.11 | 0.365 | 1.18 |
| Sample 4 | | | | End of coating | 2.94 | 40.8 | 1.66 | 0.408 | 1.76 |
| Sample 5 | | | | | 3.26 | | 1.84 | 0.451 | 1.96 |
| Sample 6 | | | | | 3.02 | | 1.71 | 0.419 | 1.81 |
| Sample 11 | Insoluble sulfur (S) | KB ECP | PVA | Start of coating | 2.34 | 22.6 | 1.32 | 0.586 | 1.40 |
| Sample 12 | | | | | 2.52 | | 1.42 | 0.631 | 1.51 |
| Sample 13 | | | | | 2.4 | | 1.36 | 0.601 | 1.4 |
| Sample 14 | | | | End of coating | 2.37 | 26 | 1.34 | 0.516 | 1.42 |
| Sample 15 | | | | | 2.63 | | 1.49 | 0.573 | 1.58 |
| Sample 16 | | | | | 2.59 | | 1.47 | 0.564 | 1.55 |

In general, knife-over-roll coating often provides uneven coatings because the slurry forms a settling aggregate while waiting in a dam (i.e., a reservoir) for application. As can be seen from Table 1, the electrode produced using crystalline sulfur ($S_8$) was thicker at the end of coating than at the start of coating with the difference in average thickness as large as about 10 μm, presumably because of the greater amount of aggregate in the slurry at the end of coating. With insoluble sulfate (S), the slurry formed less aggregate than that contained crystalline sulfate ($S_8$); the increase in average thickness of the electrode at the end of coating from the start of coating was only about 3 μm, demonstrating that the thickness of the electrode was almost constant. Furthermore, the volume density was higher with insoluble sulfur (S) than with crystalline sulfur ($S_8$).

Figure 7A:
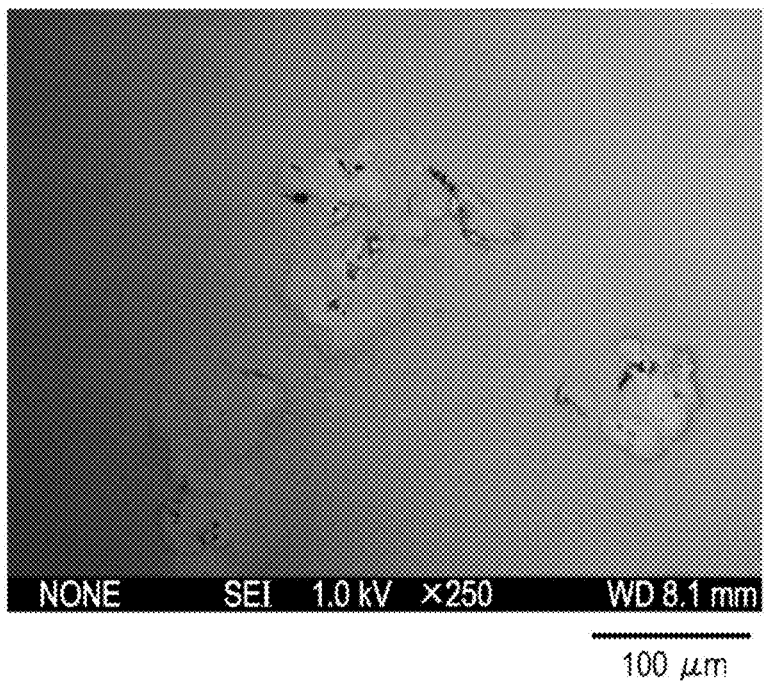
FIGS. 7A and 7B are images provided as substitutes for drawings and show the surface of the electrode of the Comparative Example, which had a coating of a slurry that contained crystalline sulfur, imaged by scanning electron microscopy at the start and end of coating, respectively.
Figure 7B:
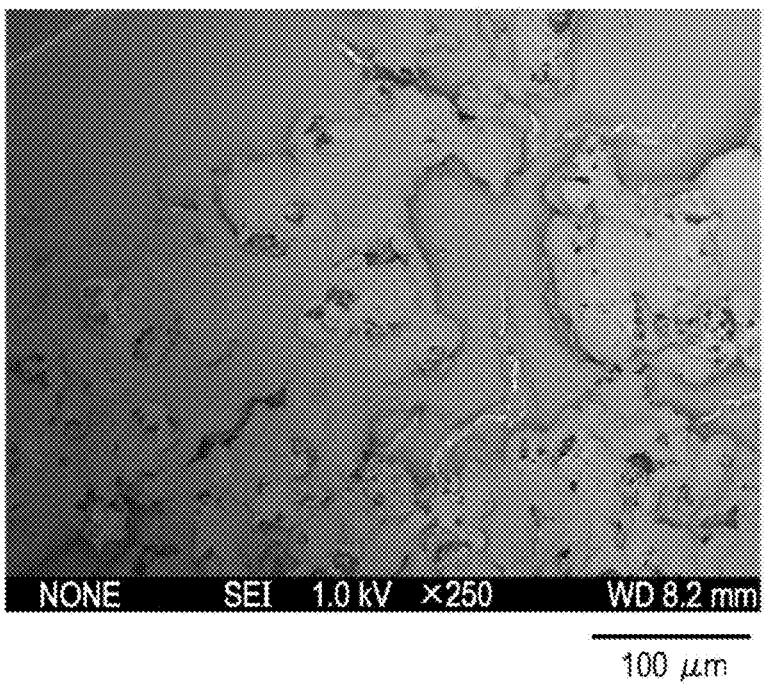

Then lithium-sulfur cells were produced. Each lithium-sulfur cell was composed of the positive electrode for lithium-sulfur cells of the Example or the Comparative Example, a negative electrode made of metallic lithium, and an electrolytic solution of 0.5 M LiTFSI and 0.4 M $LiNO_3$ in DOL/DME. For the positive electrode for lithium-sulfur FIGS. 7A and 7B are scanning electron microscopic images that show the surface of the electrode with a coating of the crystalline sulfur ($S_8$)-containing slurry at the start and end of coating, respectively. As shown in FIG. 7B, many aggregate clusters that had diameters of 20 to 100 μm were observed at the end of coating.

Figure 8A:
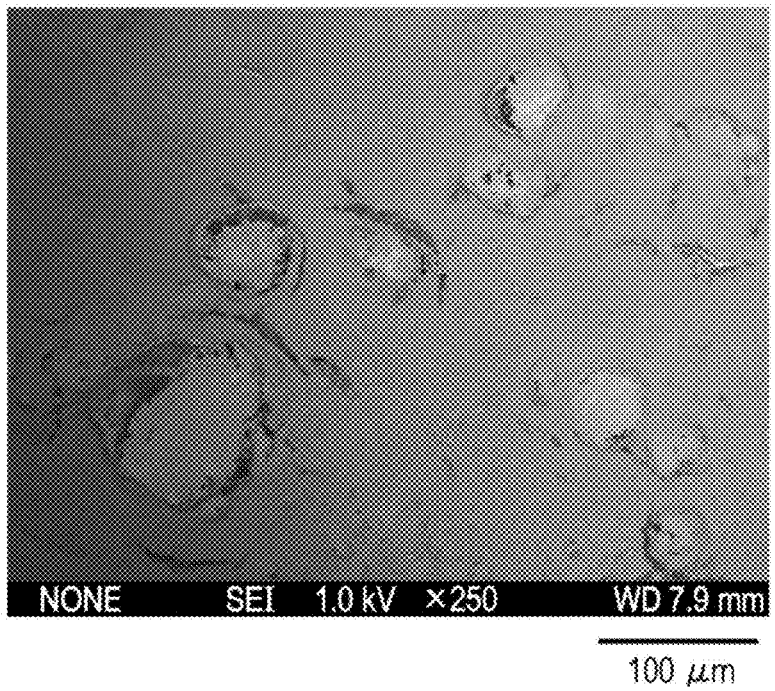
FIGS. 8A and 8B are images provided as substitutes for drawings and show the surface of the electrode of the Example, which had a coating of a slurry that contained insoluble sulfur, imaged by scanning electron microscopy at the start and end of coating, respectively.
Figure 8B:
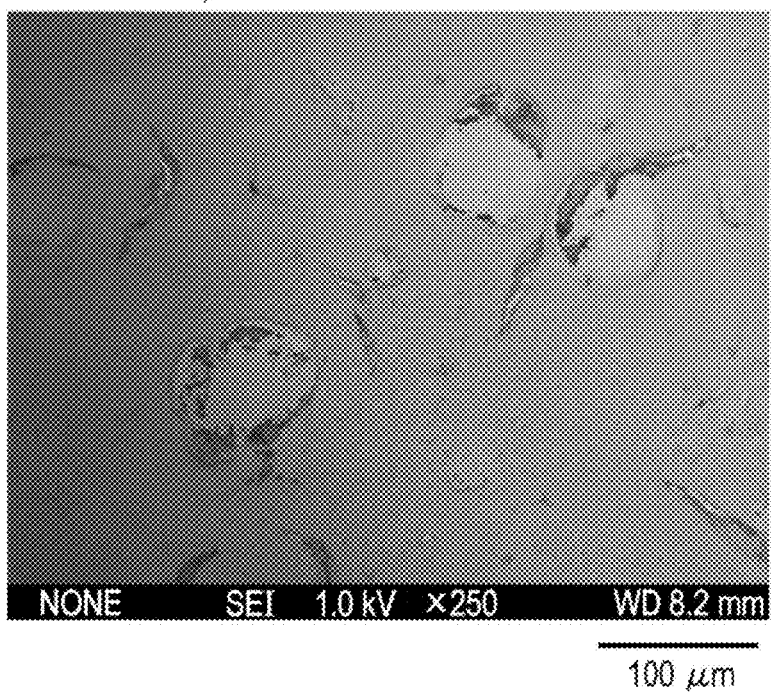

FIGS. 8A and 8B are scanning electron microscopic images that show the surface of the electrode with a coating of the insoluble sulfur (S)-containing slurry at the start and end of coating, respectively. As can be seen from FIGS. 8A and 8B, aggregate clusters were few in number both at the start and end of coating.

Figure 9:
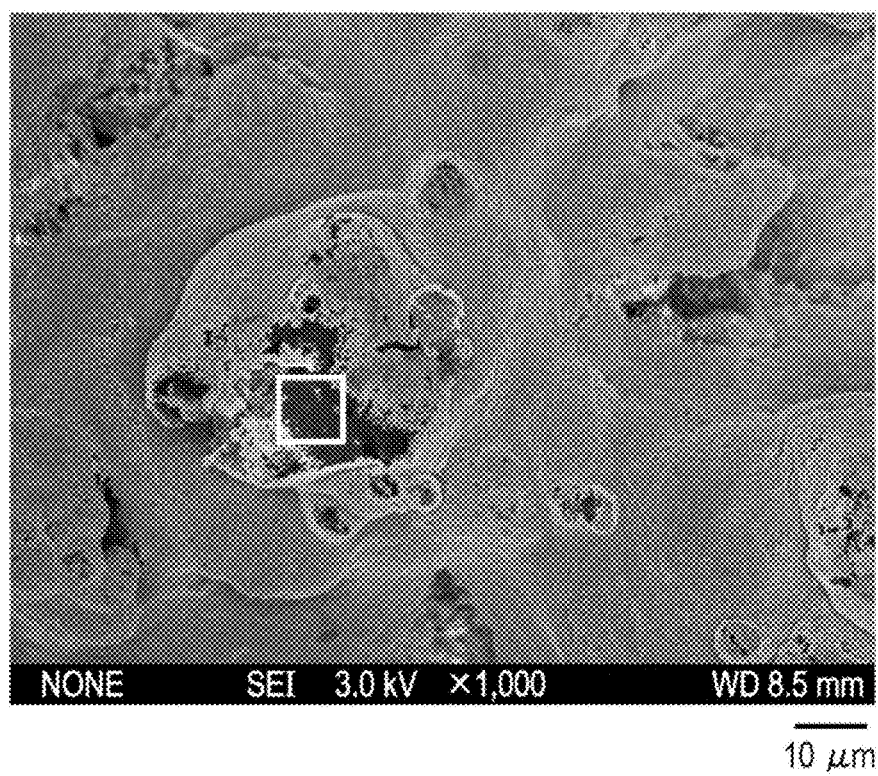
FIG. 9 is an image provided as a substitute for a drawing and shows an aggregate cluster and the surrounding area on the surface of the electrode of the Comparative Example, which had a coating of a slurry that contained crystalline sulfur, imaged by scanning electron microscopy at the end of coating.
Figure 10:
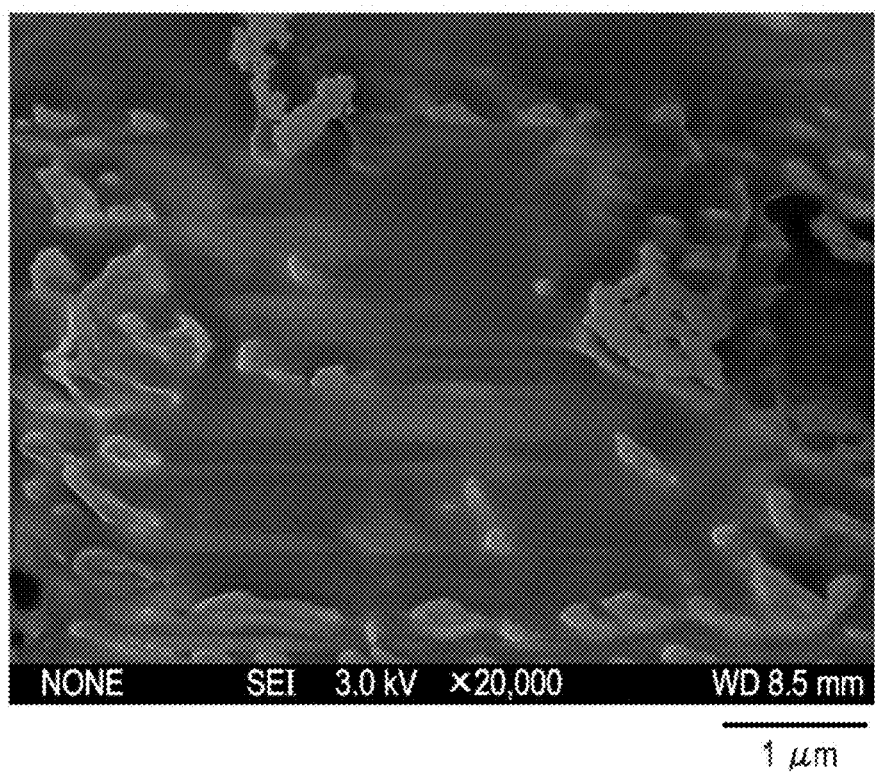
FIG. 10 is an image provided as a substitute for a drawing and is a magnified view of the aggregate cluster in FIG. 9 in the area enclosed by the square.

FIG. 9 is a scanning electron microscopic image that shows the surface of the electrode that had a coating of the crystalline sulfur ($S_8$)-containing slurry at the end of coating, close up to one aggregate cluster. FIG. 10 is a scanning electron microscopic image that shows a magnified view of the aggregate cluster in FIG. 9 in the area enclosed by the square (a pore). Irradiating the surface of the electrode in FIG. 10 with an electron beam from the electron microscope easily evaporated the aggregate, suggesting that the main component of the aggregate was sulfur.

The arithmetic mean surface roughness ($R_a$) of these electrodes was evaluated using a laser scanning microscope (Keyence). The results are summarized in Table 2. As can be seen from Table 2, the $R_a$ of the crystalline sulfur ($S_8$)-containing electrode measured at the end of coating was greatly different from that at the start of coating; the surface of the electrode was much rougher at the end of coating, presumably because of the greater amount of aggregate at the end of coating. The insoluble-sulfur-containing electrode exhibited similar $R_a$ values at the start and end of coating compared with that contained crystalline sulfur ($S_8$); the thickness of this electrode was substantially constant.

TABLE 2

| Test articles | Arithmetic mean surface roughness (Ra) |
|---|---|
| $S_8$, start of coating | 4.25 μm |
| $S_8$, end of coating | 12.04 μm |
| Insoluble S, start of coating | 5.46 μm |
| Insoluble S, end of coating | 6.56 μm |

3. Embodiment 3

Lithium-Sulfur Cell

In Embodiment 3, a specific example of the structure of a lithium-sulfur cell according to Embodiment 2 is described.

Figure 11:
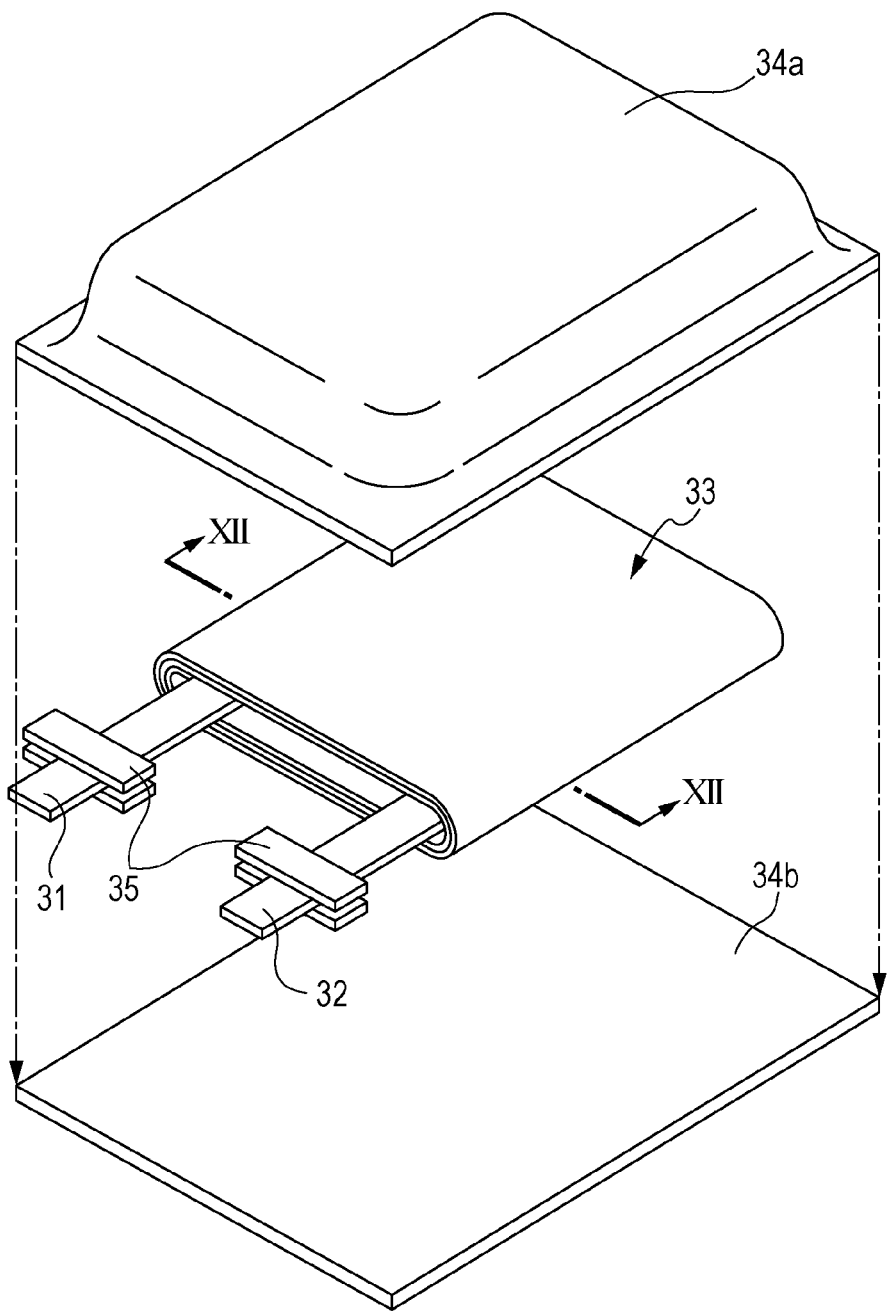
FIG. 11 is an exploded perspective view of a lithium-sulfur cell according to Embodiment 3.

FIG. 11 is an exploded perspective view of this lithium-sulfur cell.

As illustrated in FIG. 11, this lithium-sulfur cell has a wound electrode unit 33 and film package components 34a and 34b, and the wound electrode unit 33 has lead wires on the positive side and the negative side (a positive electrode lead 31 and a negative electrode lead 32, respectively).

The positive electrode lead 31 and the negative electrode lead 32 extend out of the package components 34a and 34b and are headed in, for example, the same direction. Examples of the materials of which the positive electrode lead 31 and the negative electrode lead 32 are individually made include metals such as aluminum (Al), copper (Cu), nickel (Ni), and stainless steel. The positive electrode lead 31 and the negative electrode lead 32 can be, for example, thin plates or pieces of wire mesh.

The package components 34a and 34b can be, for example, rectangular pieces of a laminated film composed of nylon film, aluminum foil, and polyethylene film stacked in this order. In an illustrative structure, the package components 34a and 34b face the wound electrode unit 33 on the polyethylene film side and are in contact with each other at the edge by fusion bonding or with an adhesive agent. An adhesive film 35 is interposed between each of the package components 34a and 34b and each of the positive electrode lead 31 and the negative electrode lead 32 to keep out the external air. The adhesive film 35 is made of a material that adheres to the positive electrode lead 31 and the negative electrode lead 32. For example, when the positive electrode lead 31 and the negative electrode lead 32 are made of any of the metals listed above, the adhesive film 35 is preferably made of polyethylene, polypropylene, modified polyethylene, modified polypropylene, or any other polyolefin.

The package components 34a and 34b can also be made from materials other than the laminated film described above, e.g., a laminated film in a different structure, a film of polypropylene or other polymers, and a metal film.

Figure 12:
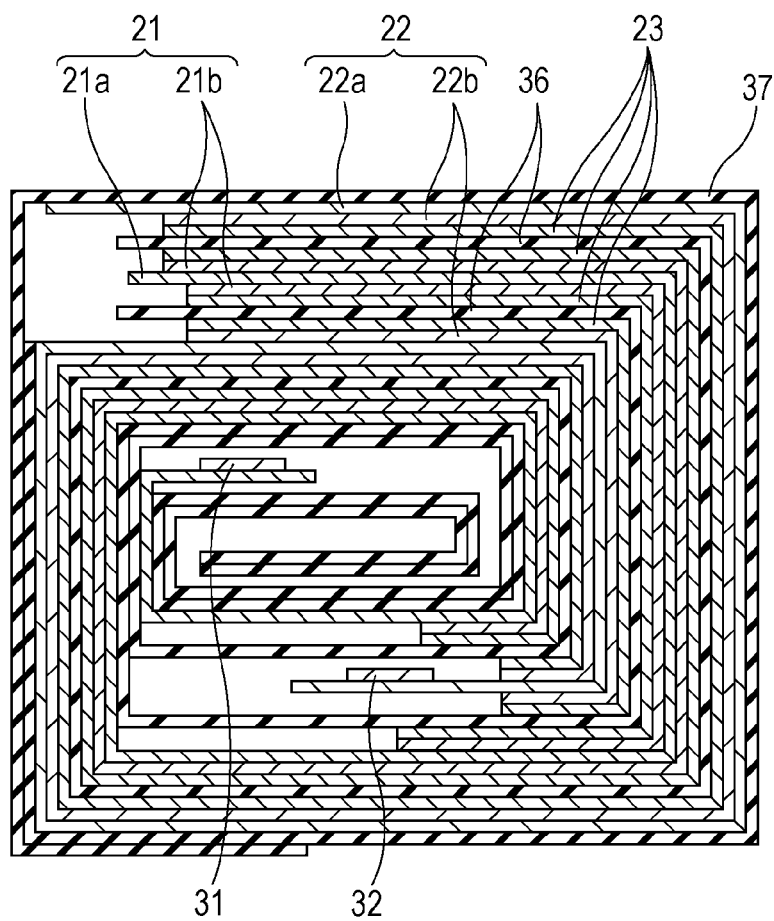
FIG. 12 is a cross-sectional view of the wound electrode unit of the lithium-sulfur cell in FIG. 11, taken along line XII-XII.

FIG. 12 is a cross-sectional view of the wound electrode unit 33 in FIG. 11, taken along line XII-XII.

As illustrated in FIG. 12, the wound electrode unit 33 is a stack of a positive electrode 21 and a negative electrode 22 wound with a separator 36 and an electrolyte 23 therebetween and is wrapped in a protective tape 37.

In an illustrative structure, the positive electrode 21 has a collector (a positive electrode collector 21a) that has a pair of opposite sides and a compound layer (a positive electrode compound layer 21b) on both sides or either side of the positive electrode collector 21a. The positive electrode collector 21a is exposed, i.e., not covered with the positive electrode compound layer 21b, in a portion at either longitudinal end, and the positive electrode lead 31 extends from this exposed portion. The positive electrode collector 21a corresponds to the conductive substrate 11 of the positive electrode for lithium-sulfur cells illustrated in FIG. 1, and examples of the materials from which this collector can be made include metal foils such as aluminum foil, nickel foil, and stainless steel foil. The positive electrode compound layer 21b corresponds to the carbon nanotubes 12 and the sulfur 13 on the conductive substrate 11 of the positive electrode for lithium-sulfur cells illustrated in FIG. 1.

The negative electrode 22, in an illustrative structure, has a collector (a negative electrode collector 22a) that has a pair of opposite sides and a compound layer (a negative electrode compound layer 22b) on both sides or either side of the negative electrode collector 22a. The negative electrode collector 22a is preferably made from copper (Cu) foil, nickel foil, stainless steel foil, or any other metal foil that has good electrochemical stability, conductivity, and mechanical strength. In particular, copper foil is highly preferred because of high conductivity. The negative electrode compound layer 22b is made of, for example, metallic lithium.

The separator 36 is, for example, a plastic or ceramic porous film, and examples of plastic materials that can be used include polytetrafluoroethylene, polypropylene, and polyethylene. A multilayer porous film that has two or more porous layers made of different plastic or ceramic materials can also be used. Polyolefin porous films are preferred because such a film effectively prevents short-circuiting and improves the safety of the cell by the "shut-down" effect. In particular, polyethylene is a highly preferred material for the separator 36 because of the shut-down effect that occurs in the temperature range of 100° C. to 160° C., both inclusive, and excellent electrochemical stability. Polypropylene is also preferred. Copolymers or blends of polyethylene or polypropylene with other chemically stable plastics can also be used.

Method for Manufacturing the Lithium-Sulfur Cell

The following describes an illustrative method for manufacturing this lithium-sulfur cell.

First, a positive electrode compound layer 21b is formed on a positive electrode collector 21a to form a positive electrode 21, and a negative electrode compound layer 22b is formed on a negative electrode collector 22a to form a negative electrode 22.

Then, in an illustrative procedure, a positive electrode lead 31 is attached to the positive electrode collector 21a, and an electrolyte 23 is formed on the positive electrode compound layer 21b, i.e., on both sides or either side of the positive electrode 21. Likewise, a negative electrode lead 32 is attached to the negative electrode collector 22a, and the electrolyte 23 is formed on the negative electrode compound layer 22b, i.e., on both sides or either side of the negative electrode 22.

After the electrolyte 23 is formed, the positive electrode 21 and the negative electrode 22 are stacked. The obtained stack is wound and then wrapped in a protective tape 37 to form a wound electrode unit 33.

After the wound electrode unit 33 is formed in such a way, in an illustrative procedure the wound electrode unit 33 is sandwiched between package components 34a and 34b and sealed by joining the package components 34a and 34b at the edge by fusion bonding or other suitable techniques, with an adhesive film 35 placed between each of the positive electrode lead 31 and the negative electrode lead 32 and each of the package components 34a and 34b.

By such a method, the lithium-sulfur cell illustrated in FIGS. 11 and 12 is manufactured.

The advantages of Embodiment 3 are similar to those of Embodiment 2.

The foregoing is a detailed description of some embodiments and an example of the present disclosure. It should be understood that the present disclosure is not limited to the foregoing embodiments and example and various modifications may occur.

For instance, the values, structures and configurations, shapes, and materials mentioned in the foregoing embodiments and example are for illustration purposes only. Different values, structures and configurations, shapes, and materials may be used as appropriate.

To take an example, the cell can be in forms other than a wound cell, such as a multilayer cell and a bi-cell. The bi-cell can be, for example, a form of a cell that has unit A (a stack of a positive electrode/an electrolyte/a separator/an electrolyte/a negative electrode/an electrolyte/a separator/an electrolyte/a positive electrode), unit B (a structure that has a positive electrode in place of a negative electrode and vice versa, i.e., a stack of a negative electrode/an electrolyte/a separator/an electrolyte/a positive electrode/an electrolyte/a separator/an electrolyte/a negative electrode), and a strip separator folded over in several layers with units A and B alternately interposed.

Furthermore, the negative electrode may contain a material that is capable of occluding and releasing ions other than lithium ions, unlike that in the lithium-sulfur secondary cells described as some embodiments of the present disclosure. For example, materials capable of occluding and releasing ions such as sodium, magnesium, magnesium salt, and aluminum ions can be used to make the negative electrode. When such a negative electrode is used, the electrolyte can be an electrolyte that contains one or a combination of cations selected from sodium, magnesium, aluminum, and tetraalkylammonium ions.

The present technology can take other forms including the following:

(1) a secondary cell that has a positive electrode, a negative electrode, and an electrolyte, the positive electrode containing insoluble sulfur;

(2) the secondary cell according to (1), wherein the positive electrode contains the insoluble sulfur and a conducting agent;

(3) the secondary cell according to (2), wherein the conducting agent contains at least one carbon material;

(4) the secondary cell according to (3), wherein the at least one carbon black material includes at least one selected from carbon black, activated carbon, carbon fiber, carbon nanotubes, and graphene;

(5) the secondary cell according to any of (1) to (4), wherein the negative electrode contains a material that occludes and releases lithium ions;

(6) the secondary cell according to any of (1) to (4), wherein the negative electrode contains at least one selected from lithium, sodium, magnesium, a magnesium salt, aluminum, a lithium-containing alloy, a carbon material capable of occluding and releasing lithium ions, tin oxide, silicon, and titanium oxide;

(7) the secondary cell according to any of (1) to (7), wherein the electrolyte contains at least one cation selected from lithium, sodium, magnesium, aluminum, and tetraalkylammonium ions;

(8) a method for manufacturing a secondary cell, the method including applying a slurry that contains insoluble sulfur to a conductive substrate to form a positive electrode;

(9) the method for manufacturing a secondary cell according to (8), wherein the slurry contains the insoluble sulfur and a conducting agent;

(10) a positive electrode for secondary cells, the positive electrode having a conductive substrate and insoluble sulfur on the conductive substrate;

(11) a method for manufacturing a positive electrode for secondary cells, the method including applying a slurry that contains insoluble sulfur to a conductive substrate to form the positive electrode;

(12) a battery pack that has a secondary cell, a control unit for the secondary cell, and a package that contains the secondary cell, the secondary cell having a positive electrode, a negative electrode, and an electrolyte, the positive electrode containing insoluble sulfur;

(13) an electronic device that has a secondary cell, the secondary cell having a positive electrode, a negative electrode, and an electrolyte, the positive electrode containing insoluble sulfur, the electronic device powered by the secondary cell; and

(14) an electric vehicle that has a secondary cell and a transducer, the secondary cell having a positive electrode, a negative electrode, and an electrolyte, the positive electrode containing insoluble sulfur, the transducer configured to receive electrical power from the secondary cell and convert the received electrical power into a force that drives the vehicle.

What is claimed is:

1. A method for manufacturing a positive electrode for a secondary cell, the method comprising:
mixing only insoluble sulfur and a conductive agent and producing a first product;
dissolving a binder in a solvent and producing a second product;
mixing together the first product and the second product and producing a third product;
adding more of the solvent and the third product until a solid content of a resulting mixture is 20% by weight of the resulting mixture;
blending the resulting mixture and producing a slurry containing at least 50% by weight of the insoluble sulfur; and
applying the slurry onto a conductive substrate.

2. The method for manufacturing a positive electrode for a secondary cell according to claim 1, wherein the a conducting agent is a carbon black.

3. The method of claim 1, wherein, in the blending step, the resulting mixture is blended using beads.

4. The method of claim 3, wherein the beads are removed from the slurry before it is applied to the conductive substrate.

* * * * *